No Printed Specification Available
3156X
T. ROWAND.
Rolling Wagon Tires.
Patented Dec. 24, 1819.
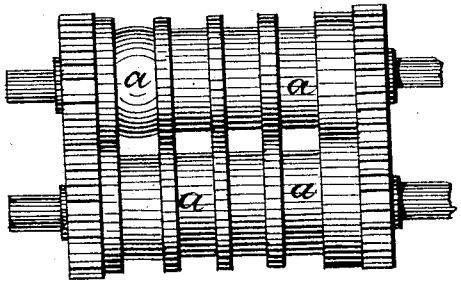
N. PETERS, Photo-Lithographer, Washington, D. C.

MISSING PAGE TEMPORARY NOTICE

PATENT # 3156X FOR ISSUE DATE 12-24-1819

HAS BEEN SCANNED, BUT WITH MISSING PAGE(S). UPON RECEIVING OF MISSING PAGE(S), THE ENTIRE DOCUMENT WILL RE RESCANNED. PLEASE CALL IMAGE DATA ADMINISTRATION STAFF OF 557-6154 IF YOU HAVE A QUESTION. ASK FOR DAVE GROOMS, ANITA YOUNG OR POLA JONES.

THIS NOTICE IS FOR THE MISSING PAGE CONTAINING:

COLUMN # All text